(12) United States Patent
Burke et al.

(10) Patent No.: US 7,774,380 B2
(45) Date of Patent: Aug. 10, 2010

(54) TECHNIQUE FOR FINDING REST RESOURCES USING AN N-ARY TREE STRUCTURE NAVIGATED USING A COLLISION FREE PROGRESSIVE HASH

(75) Inventors: Thomas C. Burke, Durham, NC (US); Annapureddy S. Reddy, Morrisville, NC (US); Aravind Srinivasan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/963,338

(22) Filed: Dec. 21, 2007

(65) Prior Publication Data

US 2009/0164485 A1 Jun. 25, 2009

(51) Int. Cl.
*G06F 17/30* (2006.01)
(52) U.S. Cl. .................. 707/803; 707/999.101
(58) Field of Classification Search ............... 707/803, 707/999.101
See application file for complete search history.

(56) References Cited

U.S. PATENT DOCUMENTS

| | | | |
|---|---|---|---|
| 7,177,940 B1 * | 2/2007 | Holan et al. ............. 709/231 |
| 7,543,078 B2 * | 6/2009 | Sun ......................... 709/245 |
| 2005/0055437 A1 | 3/2005 | Burckart et al. |
| 2006/0064469 A1 * | 3/2006 | Balasubrahmaniyan et al. ..................... 709/218 |
| 2007/0136279 A1 * | 6/2007 | Zhou et al. ................ 707/6 |

* cited by examiner

*Primary Examiner*—Cheryl Lewis
(74) *Attorney, Agent, or Firm*—Patents on Demand, P.A.; Brian K. Buchheit (57) ABSTRACT

The present invention discloses a data structure which, given an identifier for a Representational State Transfer (REST) resource, can rapidly yield a configured target and simultaneously yield all configured pattern based rules and constraints for the target. The disclosed data structure is a tree structure including nodes for URL portions. Each node is associated with a hash tree specifically grown in a manner that ensures collision occurrences are non-existent. The tree structure is effectively two or more superimposed trees; one for URL pattern matching to determine a target, another for determining constraints. A single tree traversal, which can be based on a progressive hash, can be used to concurrently determine a target and a set of constraints, which represents improved performance over conventional implementations that require multiple, distinct query/response operations to produce equivalent results.

20 Claims, 4 Drawing Sheets

TECHNIQUE FOR FINDING REST RESOURCES USING AN N-ARY TREE STRUCTURE NAVIGATED USING A COLLISION FREE PROGRESSIVE HASH

BACKGROUND

1. Field of the Invention

The present invention relates to the field of URL look-ups and, more particularly, to a technique for finding REST resources and constraints using an n-ary tree structure navigated using a collision free progressive hash.

2. Description of the Related Art

U.S. Published Patent Application No. 20050055437-A1, U.S. Pat. No. 7,523,171, entitled "Multidimensional Hashed Tree Based URL Matching Engine Using Progress Hashing" disclosed a mechanism for matching uniform resource locators (URLs) to resources and/or rules. In this application, each node of a tree structure is associated with a URL portion and includes a multidimensional hash table. These hash tables are established and grown in a manner that ensures no hash collisions occur at each node. Growing such a hash structure ensures quick look-up, although some additional time is sometimes necessary to re-structure a hash table when adding entries to ensure that collisions are avoided. U.S. Published Patent Application No. 20050055437-A1 was primarily directed to a Web 1.0 environment, where URL lookups were needed to find Web site addresses for purposes of serving a Web page associated with that address to a requesting user.

Web 2.0 applications have been changing a manner the Web is being used. Web 1.0 Web resources have traditionally been for information presentation, meaning Web 1.0 was primarily a "read only" computing space from a user perspective. Web 2.0 technologies, however, have caused the Web to evolve into a read, write, update computing space, which has generally been termed Web 2.0. In other words, many Web 2.0 applications, such as Web office productivity applications, collaboration applications, content sharing applications, social networking sites, BLOGS, WIKIS, Mash-ups, and the like have emerged, which depend upon user provided information to increase value to that user and to other users of the Web 2.0 application.

One important standard that defines a manner for retrieving, posting, updating, and deleting Web 2.0 content is the Representational State Transfer (REST) architecture. In a REST architecture, application state and functionality are divided into resources, each of which is uniquely addressable through a URL. REST architectures have client/server separation, which simplifies component implementation, reduces the complexity of connector semantics, improves the effectiveness of performance tuning, and increases scalability. Interactions with REST resources generally involve targeting a resource with a URL, passing the resource one or more parameters, and issuing one of a small set of commands. These commands include GET, POST, PUT, and DELETE, for retrieving, updating, adding, and deleting information, respectively.

In REST implementations, not only must URL's be constantly looked-up in tables, but additional target-specific concerns must be handled as well. For example, many REST resources have a set of constraints associated with them, such as security constraints. Traditionally, URL look-ups and constraint look-ups have been distinct operations, each incurring a distinct implementation cost. Many of the constraints are based upon "pattern matched" rules, or rules that apply to a set of related REST resources and not just to a specific resource itself. What is needed is an efficient mechanism for not only performing a URL lookup, but for also acquiring all pattern based rules and constraints associated with this URL.

SUMMARY OF THE INVENTION

The present invention discloses a data structure which, given an identifier for a Representational State Transfer (REST) resource, can rapidly yield a configured target and can simultaneously yield all configured pattern based rules and constraints for the target. This data structure can be part of an "out of the box" solution, which can be easily adapted and applied to any REST based software solution. The disclosed data structure is a tree structure including nodes for URL portions. Each node is associated with a hash tree specifically grown in a manner that ensures collision occurrences are non-existent. The tree structure is effectively two or more superimposed trees; one for URL pattern matching to determine a target, another for determining constraints. A single tree traversal, which can be based on a progressive hash, can be used to concurrently determine a target and a set of constraints, which represents improved performance over conventional implementations that require multiple, distinct query/response operations to produce equivalent results.

The present invention can be implemented in accordance with numerous aspects consistent with material presented herein. For example, one aspect of the present invention can include a tree data structure that includes a set of hierarchically linked nodes. Each node can represent a delineated portion of a URL. Each non-terminal node of the tree can include a target object for specifying node specific rules/resources, a constraint object for specifying node specific constraints, and a multidimensional hash table. The multidimensional hash table can be used to navigate from a parent URL node to a child URL node. The multi-dimensional hash table can be structured in a collision free manner to yield a unique child node given a unique hash value associated with the child node. Information specifying the tree data structure can be digitally encoded in a media, which is able to be read by a computing device.

Another aspect of the present invention can include a method for finding URL targets and constraints using an n-ary tree navigated through a progressive hash. The method can include a step of identifying a URL. The URL can have a set of delineated portions. The URL can reference a target software object and at least one software object constraint. An n-ary tree having a set of nodes can be traversed. Each node can be associated with one of the delineated portions. Each non-terminal node of the n-ary tree can include a target object for specifying node specific rules/resources, a constraint object for specifying node specific constraints, and a multi-dimensional hash table. A single traversal of the n-ary tree can permit a determination of a target object for the identified URL, a set of constraints associated with the identified URL, and all configured pattern based rules associated with the URL.

Still another aspect of the present invention can include a method for matching a URL of to a set of related resources, rules, and constraints. In the method, a portion specific hash value can be initiated. A character specific hash value for a first character of the portion can be generated. This character specific hash value can be added to the portion specific hash value. It can be determined if a next character of the portion is a character continuing the portion or a delimiter. When the determination is for a character, the generating and adding steps can be continuously repeated. The repetition can occur until the determining step determines that the next character is a delimiter. The portion specific hash value can then be used to traverse a tree data structure comprising a set of hierarchical arranged nodes. Each node can represent a delineated portions of a set of URLs, and can define node specific resources, node specific constraints, and node specific rules. Each node of the tree data structure can be associated with a multidimensional hash table. A next node of the tree structure that is traversed can be determined using the portion specific hash value.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
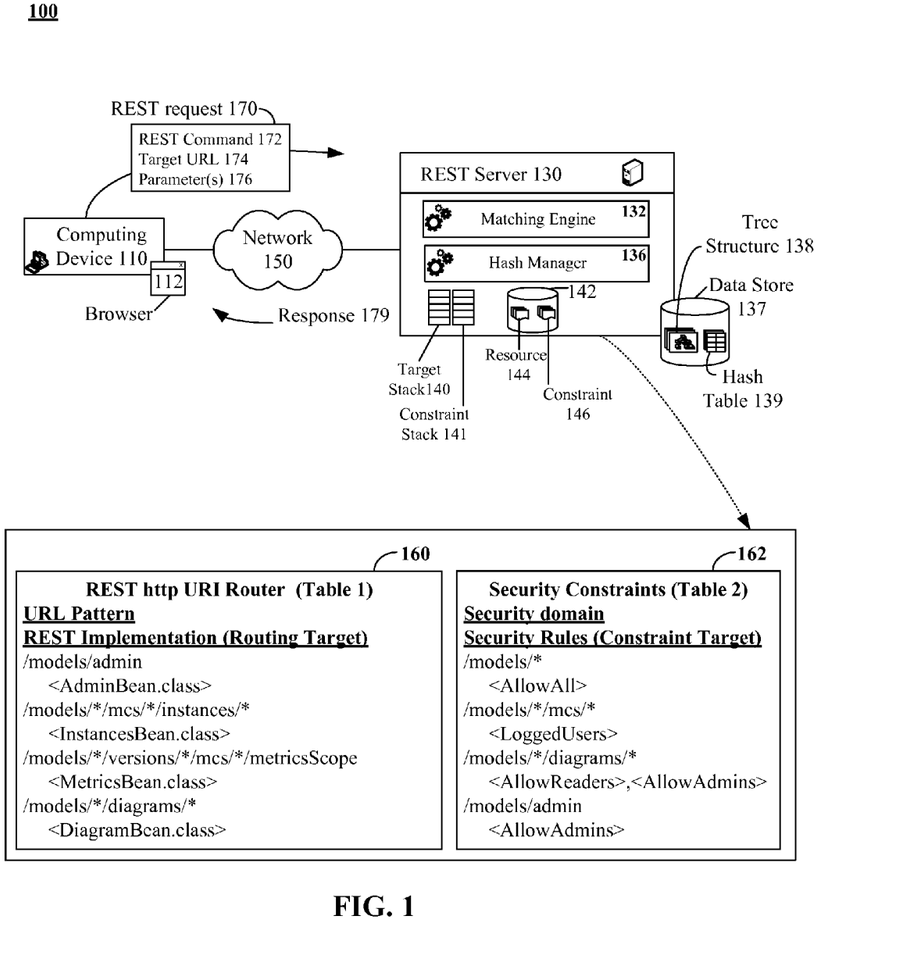
FIG. 1 is a schematic diagram of a system, where a Representational State Transfer (REST) server performs a traversal of a tree structure to determine not only a desired target for a URL, but also a set of applicable constraints.

FIG. 1 is a schematic diagram of a system 100, where a Representational State Transfer (REST) server 130 performs a traversal of a tree structure 138 to determine not only a desired target for a URL, but also a set of applicable constraints. In system 100, the REST server 130 an receive REST requests 170 from a set of computing devices 110 connected via a network 150. The requests 170 can be submitted from a browser 112, a Rich Internet Application (RIA), or any other interface capable of generating REST requests 170. Each REST request 170 can include a REST command 172 (e.g., GET, PUT, POST, DELETE), a target URL 174 unique for a REST resource 144, and a set of optional parameters 176.

The server 130 can use a matching engine 132 to determine a REST resource 144 that matches the target URL 174. The engine 132 can utilize a set of hash tables 139 to traverse a tree structure 138 of nodes, when determining which resource 144 matches the target URL 174. In addition to detecting a resource 144, each traversal of a tree structure 138 by matching engine 132 can also determine a set of constraints for the REST resource 144. As matching engine 132 executes, discovered matches can be placed in either a target stack 140 or a constraints stack 142. These matches can point to resources 144 and/or constraints 146 of data store 142. The REST server 130 can extract entries from the stacks 140, 142 to determine which resources 144 to access and which constraints 146 are to be applied to these resources 144. After performing appropriate actions for the request 170, a response 179 can be returned over network 150 to computing device 110.

When a PUT command 172 adds a new REST resource 144 to data store 142, a hash manager 136 can establish new entries for it in the appropriate tree structure 138 of data store 137. Manager 136 can ensure that the hash tables 139 used to navigate the tree structures 138 are collision free. That is, when a collision occurs when attempting to add a new entry, the hash table 139 in which the collision occurred can be restructured to avoid collisions. For example, each hash table 139 can be a multidimensional table. New dimensions can be added to a table 139 each time a collision is detected as a new entry insertion attempt is made.

Table 160 shows a set of URL patterns typical for REST resources 144 and table 162 shows a set of constraints/patterns/rules typical for constraints 146. These patterns are able to be specified in a tree structure 138 and can be concurrently extracted for a given URL 174 by matching engine 132 in a single pass. Specifically, the matching engine 132 can use a progressive hash of portions of a target URL 174 to determine how to traverse a tree data structure 138 to arrive at leaf nodes. Each portion of the URL 174 can be delimited by a previously defined delimitation character, such as a "/".

Thus, a sample URL 174 of "/foo/bar" includes two portions; one for a "foo" portion and another for a "bar" portion. The sample URL 174 can be traverse a tree structure 138 having three nodes, one for the root "/", one node for "foo", and a final node for "bar".

Each node in the tree structure 138 can include a target for that node, constraint matches for that node, and a hash table 139. The hash table 139 can contain sub-trees having a current node as a parent. Intermediate node of the tree structure 138 can include a set of patterns associated with rules/constraints that match a given target URL 174. For example, the node of "foo" from the sample URL 174 can include a "*" indicator and an associated rule, which indicates a match. This is true even though the tree structure 138 has yet to be fully traversed, since "foo" is an intermediary node, which acts as a parent for at least a node "bar".

Each time a match is achieved at a node of the tree structure 138 for either a target or for a constraint, an entry can be placed in either target stack 140 or constraint stack 142. Hence, at the end of a tree structure 138 traversal, the target stack 140 includes all target matches in order of decreasing specificity. The constraints stack 142 includes all constraints in order of decreasing specificity. In other words, the "best" or lowest level matches are preserved at a top of the respective stacks 140, 142. Use of a stack 140, 142 is important, since the tree structure 138 is traversed progressively once to determine both targets and constraints. Thus, at a time that an intermediate tree node is matched to a URL 174 it is unknown whether a lower level node will match a subsequent URL portion of the URL 174, since subsequent URL portions have yet to be processed. Additionally, by preserving "all" matches, multiple discovered patterns/rules/constraints can be determined in a single pass.

It should be appreciated that although the system 100 shows a REST server 130 the technique for concurrent performing target and constraint matching can be used outside of a REST context. That is, any URL addressable resource, REST based or otherwise, can be detected by matching engine 132 along with resource 144 related constraints 146. A REST context merely represents an applicable implementation environment for the tree structure 138 based matching techniques expressed herein.

As used herein, REST refers generally to a technique for exposing a Web service as a URL addressable resource 174. A REST resource 144 need not respond to each of the basic REST primitive commands (e.g., GET, POST, PUT, and DELETE) but can be designed to only respond to a subset of these commands. Thus, any URL addressable resource can be considered a "REST" resource for purposes of system 100.

The hash table 138 can be a multi-dimensional table that is able to determine a target node for given a URL portion when a current node of tree structure 138 is a parent of the target node. The multi-dimensional table 138 can be a three dimensional table, having X, Y, and Z values. A progressively determined hash unique for a URL portion can be an input value for each dimension. The table 138 can have any number of dimensions in various contemplated implementations and is not to be construed as limited to three dimensions.

The computing device 110 can be any device capable of interacting with the server 130 over network 150. For example, the computing device 110 can include a personal computer, a server, a mobile telephone, an internet appliance, an Internet enabled consumer electronic device, a kiosk, an embedded computer system, and the like.

Network 150 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 150 can further include circuit-based communication components and mobile communication components, such as telephony switches, modems, cellular communication towers, and the like. The network 150 can include line based and/or wireless communication pathways.

The data stores 137, 142 can be a physical or virtual storage space configured to store digital information. Data store 137 and/or 142 can be physically implemented within any type of hardware including, but not limited to, a magnetic disk, an optical disk, a semiconductor memory, a digitally encoded plastic memory, a holographic memory, or any other recording medium. Each data store 137 and 142 can be a stand-alone storage unit as well as a storage unit formed from a plurality of physical devices. Additionally, information can be stored within each of the data stores 137 and 142 in a variety of manners. For example, information can be stored within a database structure or can be stored within one or more files of a file storage system, where each file may or may not be indexed for information searching purposes. Further, zero or more of the data stores 137 and 142 can optionally utilize one or more encryption mechanisms to protect stored information from unauthorized access.

Figure 2:
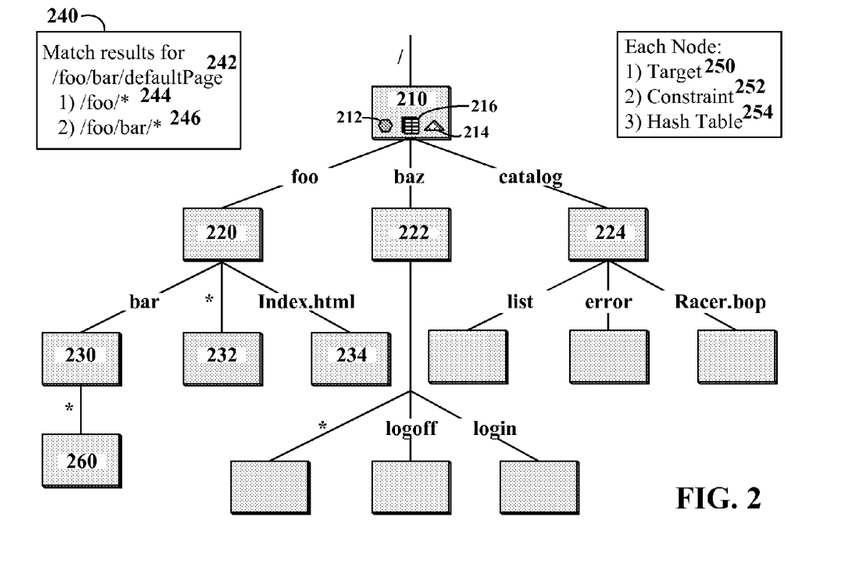
FIG. 2 is a schematic diagram of a tree structure having a plurality of nodes, each node having an associated target, constraint, and hash table in accordance with an embodiment of the inventive arrangements disclosed herein.

FIG. 2 is a schematic diagram of a tree structure having a plurality of nodes, each node (e.g. node 210) having an associated target 250 (e.g., target 212), constraint 252 (e.g., constraint 214), and hash table 254 (e.g., table 216) in accordance with an embodiment of the inventive arrangements disclosed herein. The tree structure can be a structure used in a system 100. Navigation of the tree structure can be based upon a progressive hash optimized to eliminate a possibility of collisions.

As shown, the tree data structure includes a set of interconnected nodes (represented by cubes), each node representing a possible URL portion. The transition from one node to the next is illustrated by a line connecting the nodes. A hash table 254 of a "parent" node identifies children nodes connected to it. For example, the hash table 216 of node 210 (e.g., root node "/") identifies node 220 (e.g., URL portion "foo"), node 222 (e.g., URL portion "baz"), and node 224 (e.g., URL portion "catalog"). Hence, table 216 includes a hash code corresponding to the URL portion "foo," which results in a traversal from node 210 to node 220. Similarly, node 222 includes a node-specific target, a constraint, and a hash table, where the hash table includes values associated with URL portions "bar" (e.g., node 230), "*" (e.g., node 232), and "Index.html" (e.g., node 234).

In FIG. 2, a sample traversal 240 of a tree structure for a URL of "/foo/bar/default Page" 242 is shown, which yields nodes of "/foo/*" 244 and "/foo/bar*" 246. A first step in retrieving a set of targets and constraints associated with the sample URL 242 involves initializing a "current node" of an algorithm to the root node 210, which is associated with delimiter "/". The first clause of the URL 242 is progressively hashed to generate a hash value, which when looked up in table 216 is associated with node 220 for a URL portion of "foo". Thus, "foo" is the "next node" of the tree to be traversed.

The tree data structure can concurrently determine a next node and a set of targets/constraints for a current node, since both of these operations are independent of each other. Hence, while the next node from node 210 is being determined, a set of targets 212 and constraints 214 applicable for the sample URL 242 can be processed. When a target 212 and/or constraint 214 is matched against a current node, an entry can be added to a target and/or a constraint stack. In the sample, no target or constraint is "matched" against the root node for URL portion "/". If a wildcard node existed against node 210 or if any set of rules (e.g., a regular expression based in part upon a relationship between node 210 and child nodes 220, 222, and/or 224) defined in either the target 212 or constraint 214 were matched, entries could be added to either the target or constraint stack as appropriate.

Navigation of the tree continues, and a current node of a traversal algorithm is set to "foo" or node 220. A hash value for a next clause "bar" is determined. The hash table of node 220 can be consulted, which for the determined hash value indicates that a next node to traverse in the tree is node 230. Concurrently, targets and/or constraints matching node 220 (e.g., "foo") can be evaluated. As shown, a wildcard "*" linked to node 232 can be detected that is associated with child node 232. For purposes of illustrations, this "wild card" can be assumed to apply to both the target and constraints for node 220, although each can be independently evaluated. Because of this match, an entry for URL "/foo/*" 244 can be added to both the target stack and the constraint stack.

Navigation of the tree can continue, and a current node of a traversal algorithm can be set to "bar" or node 230. A hash value for a next clause "defaultPage" of the URL 242 can be determined. A hash table of node 230 can be consulted, which fails to yield a matching value. Child node 236, however can "match" since it is associated with a wildcard character. Targets and constraints associated with node 230 can be evaluated, which results in and entry related to "/foo/bar/*" being added to a target and/or a constraint stack. Child node 246 can lack a hash table for further navigation as it is a terminal node. The node 246 can include a terminal set of node specific targets/constraints, which can be processed.

At this point the tree structure has been traversed to produce a set of matching target/rules and a set of matching constraints, which are contained in stack entries. A calling application, such as a REST processor can use these entries to perform further operations now that REST resources and/or resource specific constraints have been identified from the sample URL 242.

Figure 3:
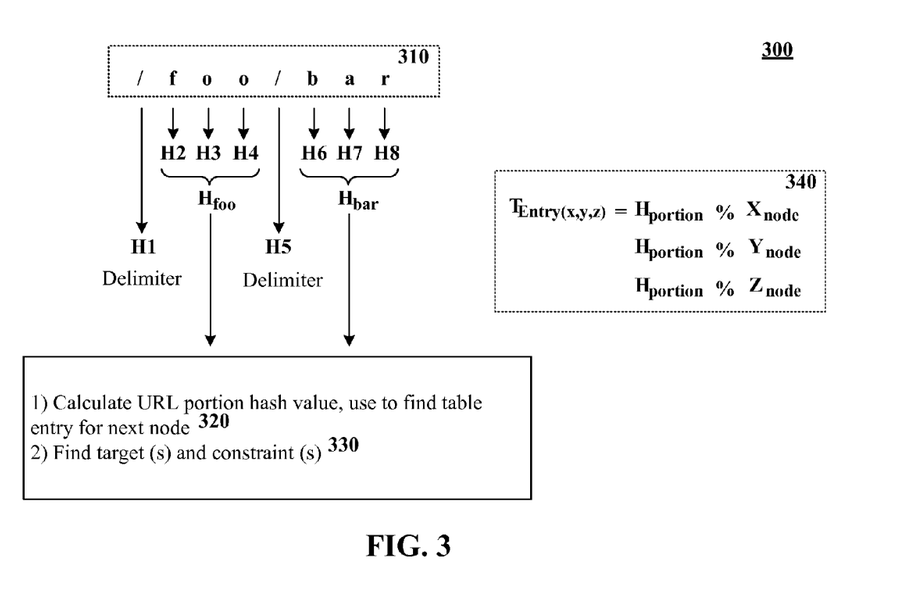
FIG. 3 is a schematic diagram illustrating an application progressive hash algorithm for a sample URL "/foo/bar" in accordance with an embodiment of the inventive arrangements disclosed herein.

FIG. 3 is a schematic diagram 300 illustrating an application progressive hash algorithm for a sample URL "/foo/bar" 310 in accordance with an embodiment of the inventive arrangements disclosed herein. Diagram 300 generates a hash value for each character of the URL 310, which produces character specific hash values H1, H2, H3, H4, H5, H6, H7, and H8.

When a hash value is for a delimiter or other special character (e.g., H1 and H5 can be values for a delimiter), a URL portion hash value can be reset. Otherwise, character specific hash values can be progressively added to produce a URL portion hash value. For example, $H_{foo}$ for a URL portion of "foo" can be a hash value equal to H2 plus H3 plus H4. Similarly, $H_{bar}$ for a URL portion "bar" can be a hash value equal to H6 plus H7 plus H8. A hash value for a URL portion (e.g., $H_{foo}$ and $H_{bar}$) is not constrained to a progressive summing of component hash values and any mathematically definable operation can be performed, so long as it is guaranteed to yield a unique portion hash value ($H_{foo}$ and/or $H_{bar}$) for each unique character string of the associated URL portion. Additionally, constructing a unique URL portion hash value should be done in a progressive fashion for performance reasons.

As shown in diagram 300, hash H1 can be generated for "/", which is determined to be a delimiter. A root node for the "/" can be determined and a hash table of the root node can be retrieved. Concurrently, targets and constraints for the root node can be processed. For each node, independent processes of looking for a next node 320 and processing node-specific targets and constraints 330 can be performed. A step of finding a next tree node 320 can include generating a portion specific unique hash value for the next node. This hash value can be compared against a multidimensional hash table associated with the "current node" as previously explained for FIG. 2.

As shown, a value for H2 can be calculated for letter "f," which is added to an initial default value of $H_{foo}$ (e.g., zero). Hash value H3 is then calculated for letter "o." Since this is not a delimiter character indicating a new URL portion is to be evaluated, the H3 value is added to $H_{foo}$. Hash value H4 is then calculated for letter "o," which is also not a delimiter. H4 is added to $H_{foo}$. A hash value for H5 is then calculated, which is a delimiter. The value of $H_{foo}$ can be a hash value used to look-up a next node to be navigated to from root node "/". In subsequent processing, a value for $H_{bar}$ can be determined and handled.

Look-ups performed in a three dimensional hash table can utilize equation 340. By equation 340, a unique table entry $T_{entry}$ can be determined by (X, Y, Z). Where X equals $H_{portion}$ % $X_{nodeconst}$), where Y equals $H_{portion}$ % $Y_{nodeconst}$, and where Z equals $H_{portion}$ % $Z_{nodeconst}$. $H_{portion}$ is a hash value generated for a URL portion (e.g., $H_{foo}$ and $H_{bar}$). The "%" represents the modulo operator $X_{nodeconst}$, $Y_{nodeconst}$, and $Z_{nodeconst}$ are node specific values specifically selected to ensure no hash conflicts exist. When an entry for a new child node is attempted, which results in a collision, the values of $X_{nodeconst}$, $Y_{nodeconst}$, and $Z_{nodeconst}$ can be adjusted and pre-existing entries can be re-positioned in the adjusted hash table. Accordingly, collisions are avoided and each search of the hash table can consume a constant amount of time. Since adding entries to a URL tree structure occurs significantly less frequently than tree searches and generally is less time sensitive, performance costs for occasionally adjusting hash tree entries for new nodes generally has a minimal overall impact. Additionally, the only time such adjustments are needed is when an attempt to add a new node results in a conflict with an existing node.

Figure 4:
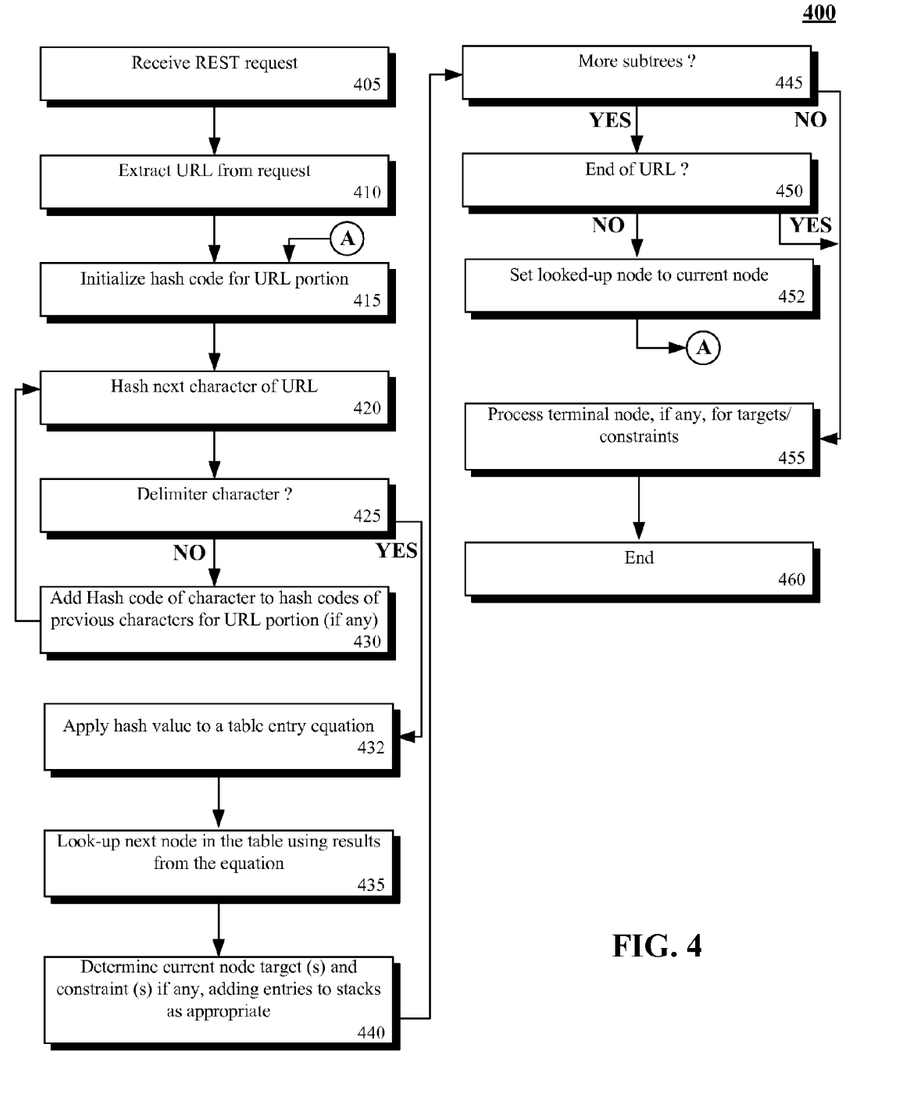
FIG. 4 is a flow chart of a method for traversing a tree structure associated with a URL using a progressive hash technique in accordance with an embodiment of the inventive arrangements disclosed herein.

FIG. 4 is a flow chart of a method 400 for traversing a tree structure associated with a URL using a progressive hash technique in accordance with an embodiment of the inventive arrangements disclosed herein. The method 400 can be performed in the context of system 100.

Method 400 can begin in step 405 where a REST request can be received. In step 410, a URL can be extracted from the request, which uniquely identifies a REST resource. In step 415, a hash code can be initialized for a URL portion. For example, a portion specific hash value can be initialized to zero. A next character of a URL can be acquired in step 420 and a hash value for this character can be determined. In step 425, a check can be performed to determine whether the character is a delimiter signifying an end of a current URL portion and a start of a new URL portion.

When the character is not a delimiter, the method can proceed from step 425 to step 430, where the character specific has value can be added to a hash value for the URL portion. Once the character hash value has been added, a next character value can be determined by proceeding from step 430 to step 420.

When a delimiter character is detected in step 425, the method can proceed from step 425 to step 432, where a hash value generated for a current URL portion can be applied to a table entry determination equation. This equation can yield a point of a multi-dimensional table/array. For example, when the multidimensional table is a three dimensional, an entry identifying point consisting of an X, Y, and Z value can be determined from the equation. Each dimension can involve a calculation, where the hash value for the portion is a parameter. The table can be constructed to ensure no collisions occur.

In step 435, a next node in the tree structure can be determined by looking up an item of the hash table corresponding to results from the table entry equation. Step 440 can be performed concurrent with and independent of steps 415-435 for the current URL portion. In step 440, targets and constraints associated with the current node can be determined, if any, and added to associated stacks.

In step 445, a determination can be made as to whether the next node is a child node of a tree structure. If so, no more sub-trees extend from the newly detected node, which can cause that node to be processed in step 455. When more sub-trees exist from the identified node, the method can proceed from step 445 to step 450, where a check of the URL being processed can be made. If the URL has ended, the method can proceed to step 455. Otherwise, the method can set the node determined from the table to a current node, shown in step 452. The method can proceed from step 452 to step 415, where a hash code for a first character in the now current URL portion can be processed.

In step 455, a terminal tree node, if present, can be processed for node-specific targets/constraints. The method can end in step 460, where the values added to target and constraint stacks that identify a set of REST resources and constraints associated with the received URL can be handled by a REST server.

Figure 5:
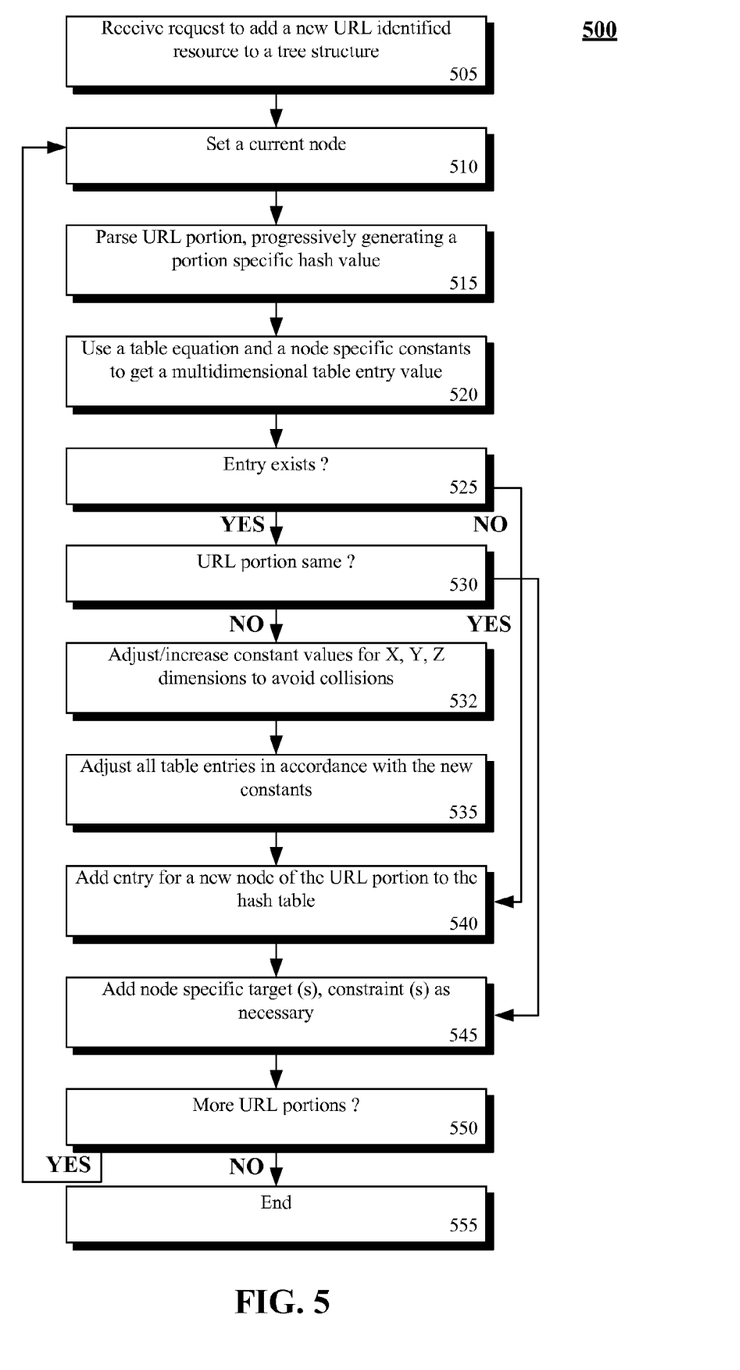
FIG. 5 is a flow chart of a method for adding a new REST resource to an existing tree structure in accordance with an embodiment of the inventive arrangements disclosed herein.

FIG. 5 is a flow chart of a method 500 for adding a new rest resource to an existing tree structure in accordance with an embodiment of the inventive arrangements disclosed herein. The method 500 can be performed in a context of a system 100.

The method can begin in step 505, where a request to add a new URL identified REST resource can be received. In step 510 a current node can be set to the beginning of the URL. In step 515, the URL portion for the current node can be parsed and a hash value for this portion can be progressively generated. In step 520, a table equation and a set of node specific constants can be used to get a table entry/position based upon the portion specific hash value. In step 525, this position of the multi-dimensional table can be queried to determine if an entry is already present at this position.

If so, the method can progress from step 525 to step 530, where a further determination can be made as to whether the pre-existing entry has the same hash value as the current URL portion. If so, they are the same and no new node in the tree structure is needed. The method can jump from step 530 to step 545. When the hash values of the new URL portion is different from the existing hash value of the target, the method can proceed from step 530 to step 532. In step 532, the constant values associated with each dimension (e.g., X, Y, Z constant values for a 3 dimensional array) can be upwardly adjusted to avoid potential conflicts. For example, initial constants for that node are X=1, Y=2, and Z=3. An entry for a URL portion having a hash value of 12 can already exist, which using a table equation ($H_{value} \% X_{const}$, $H_{value} \% Y_{const}$, $H_{value} \% Z_{const}$) yields point (0, 0, 0) of the multidimensional table. A new URL portion can have a hash value of 6, which also yields point (0, 0, 0). Since the URL portions equal and since each have a unique hash value (12 and 6), evaluation to a common point represents a hash collision. The constant values can be adjusted to (X=2, Y=3, Z=5), assuming these new constants do not result in any new potential hash collisions. In one embodiment, an increasing dimension constant algorithm based upon prime numbers or pseudo-prime numbers can be used to ensure that "upwardly" adjusting the dimensional constant values does not result in new conflicts with pre-existing table entries.

Once new constant values per dimension have been determined, the method can progress from step 530 to step 535, where all pre-existing table entries can be adjusted in accordance with the new constants. Once any necessary adjustments have been made, the method can proceed to step 540, where an entry for a new node of the URL portion of the hash table can be added. In step 545, target and/or constraint specific entries for the current node related to the new REST resource can be added as necessary.

In step 550, a determination of whether more portions of the URL exist for processing can be made. If not, the method can end, as shown by step 555. If so, the method can proceed from step 550 to step 510, where a current node setting can be advanced and the next URL portion can be processed.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for finding URL targets and constraints using an n-ary tree navigated through a progressive hash comprising:
   identifying a URL, said URL having a plurality of delineated portions, said URL referencing a target software object and at least one software object constraint;
   traversing an n-ary tree having a plurality of nodes, each node being associated with one of the delineated portions, each non-terminal node of said n-ary tree comprising a target object for specifying node specific rules/resource, a constraint object for specifying node specific constraints, and a multidimensional hash table; and
   determining from a single traversal of said n-ary tree, a target object for said identified URL, said at least one object constraint associated with said URL, and all configured pattern based rules associated with said URL.

2. The method of claim 1, further comprising:
   concurrently using independent software operations:
      determining for each node a set of node specific constraints, node specific rules, and node specific targets; and
      determining a child node of a current node, if any.

3. The method of claim 1, further comprising:
   for each delineated portion, determining a portion unique hash value using a progressive hash based upon a set of component hash values generated from each character of said delineated portion; and
   utilizing said portion unique hash value to determine an entry of the multidimensional hash table associated with a node for a next portion of the identified URL.

4. The method of claim 3, further comprising:
   for each dimension of said multidimensional hash table, calculating a dimension value by performing a modulo operation involving the portion unique hash value and a dimension specific constant.

5. The method of claim 4, wherein said multidimensional hash table is structured so that no collisions occur when searching for nodes contained in said n-ary tree.

6. The method of claim 1, said multidimensional hash table comprises at least three dimensions, which comprise an X, a Y, and a Z dimension, wherein the following equation is utilized to find a child node of a current node using the multidimensional table:
   $T_{entry} = X_{value}, Y_{value}, Z_{value}$, wherein
   $X_{value} = H_{portion} \% X_{nodeconst}$;
   $Y_{value} = H_{portion} \% Y_{nodeconst}$; and
   $Z_{value} = H_{portion} \% Z_{nodeconst}$;

wherein the $T_{entry}$ is a value from the multidimensional table in which the child node is stored, wherein $H_{portion}$ is a progressive character-by-character calculated hash value associated with a delineated portion corresponding to the child node being found using the multidimensional hash table, wherein $X_{nodecost}$, $Y_{nodeconst}$, and $Z_{nodeconstants}$ are specific to the hash table and are selected as values that ensure no hash collisions occur.

7. A computer program product comprising:
a computer usable storage medium having computer usable program code embodied therewith, the computer usable program code comprising:
 a tree data structure, said tree data structure comprising:
  a plurality of hierarchically linked nodes, each node representing a delineated portion of a URL, wherein each non-terminal node comprises a target object for specifying node specific rules/resource, a constraint object for specifying node specific constraints, and a multidimensional hash table, wherein the multi-dimensional hash table is used to navigate from a parent URL node to a child URL node, wherein the multi-dimensional hash table is structured in a collision free manner to yield a unique child node given a unique hash value associated with the child node.

8. The computer program product of claim 7, wherein a single traversal of said tree data structure for the URL, yields a configured target, all configured pattern based rules associated with the URL, and all the constraints associated with the configured target.

9. The computer program product of claim 8, wherein said configured target is a REST resource, and wherein said constraints are constraints imposed on said REST resource.

10. The computer program product of claim 7, wherein said multi-dimensional hash table is at least a three dimensional hash table.

11. The computer program product of claim 7, wherein a first dimension of said hash table for a child URL node equals a hash value for the child URL node modulo a first dimension constant, wherein a second dimension of said hash table for a child URL node equals the hash value for the child URL node modulo a second dimension constant, wherein a third dimension of said hash table for a child URL node equals the hash value for the child URL node modulo a third dimension constant.

12. The computer program product of claim 7, wherein said multidimensional hash table comprises at least three dimensions, which comprise an X, a Y, and a Z dimension, wherein the following equation is utilized to find a child node of a current node using the multidimensional table:

$T_{entry} = X_{value}, Y_{value}, Z_{value}$, wherein
$X_{value} = H_{portion} \% X_{nodeconst}$;
$Y_{value} = H_{portion} \% Y_{nodeconst}$; and
$Z_{value} = H_{portion} \% Z_{nodeconst}$, wherein the $T_{entry}$ is a value from the multidimensional table in which the child node is stored, wherein $H_{portion}$ is a progressive character-by-character calculated hash value associated with a delineated portion corresponding to the child node being found using the multidimensional hash table, wherein $X_{nodecost}$, $Y_{nodeconst}$, and $Z_{nodeconstants}$ are specific to the hash table and are selected as values that ensure no hash collisions occur.

13. A method for matching a Uniform Resource Locator (URL) of a set of related resources, rules, and constraints comprising:
for a portion of a URL, initiating a portion specific hash value;
generating a character specific hash value for a first character of said portion;
adding the character specific hash value to the portion specific hash value;
determining if a next character of said portion is a character continuing the portion or a delimiter;
when the determination is that of a character, repeating generating the character specific hash value for a next character of said portion and adding the next character specific hash value to the portion specific hash value until it is determined that the next character is a delimiter;
using the portion specific hash value to traverse a tree data structure comprising a set of hierarchical arranged nodes, each node representing a delineated portions of URLs, node specific resources, node specific constraints, and node specific rules, wherein each node of the tree data structure has an associated multidimensional hash table; and
determining a next node of the tree structure using the portion specific hash value.

14. The method of claim 13, wherein each dimension of the multidimensional hash table for the next node is individually calculated based upon the portion specific hash value.

15. The method of claim 14, further comprising for each dimensional calculation, performing a modulo operation involving the portion specific hash value and a dimension specific constant established for the multidimensional hash table, wherein values for said dimension specific constants are selected to ensure collisions do not occur when performing a hash based lookup.

16. The method of claim 13, wherein entries of the multi-dimensional tree structure comprises at least three dimensions, wherein entries are positioned in the multidimensional hash table using the equation:

$T_{entry} = X_{value}, Y_{value}, Z_{value}$, wherein
$X_{value} = H_{portion} \% X_{nodeconst}$;
$Y_{value} = H_{portion} \% Y_{nodeconst}$; and
$Z_{value} = H_{portion} \% Z_{nodeconst}$, wherein the $T_{entry}$ is a value from the multidimensional table in which the child node is stored, wherein $H_{portion}$ is a progressive character-by-character calculated hash value associated with a delineated portion corresponding to the child node being found using the multidimensional hash table, wherein $X_{nodecost}$, $Y_{nodeconst}$, and $Z_{nodeconstants}$ are specific to the hash table and are selected as values that ensure no hash collisions occur.

17. The method of claim 13, further comprising:
for each remaining portion of said URL:
generating a character specific hash value for a first character of each of said remaining portions;
adding the character specific hash value for a first character of each of said remaining portions;
determining if a next character of said portion is a character continuing the portion or a delimiter;
when the determination is that of a character, repeating generating the character specific hash value for a next character of each of said remaining portions and adding the next character specific hash value to the portion specific hash value until it is determined that the next character is a delimiter;
using the portion specific hash value to traverse a tree data structure comprising a set of hierarchical arranged nodes, each node representing a delineated portions of URLs, node specific resources, node specific constraints, and node specific rules, wherein each node of the tree data structure has an associated multidimensional hash table; and determining a next node of the tree structure using the portion specific hash value.

18. The method of claim 17, further comprising:
returning a list of matched resource, rules, and constraints to for the URL to a calling application.

19. A system for matching a Uniform Resource Locator (URL) of to a set of related resources, rules, and constraints comprising:

a data store configured to store a plurality of tree structure objects, wherein each tree structure object comprises a plurality of hierarchically linked nodes, each node representing a delineated portion of a URL, wherein each non-terminal node comprises a target object for specifying node specific rules/resources, a constraint object for specifying node specific constraints, and a multidimensional hash table, wherein the multi-dimensional hash table is structured in a collision free manner to yield a unique child node given a unique hash value associated with the child node;

a hash manager configured to add new URL addressed entries to said tree structure objects, wherein said hash manager is configured to dynamically restructure said multidimensional hash table associated with a to be added URL addressed entry to ensure that the multi-dimensional hash table is structured in the collision free manner; and a matching engine configured to receive a URL identifier, to traverse said tree structure in a single pass to determine a set of configured targets and a set of constraints for the target that are associated with said URL identifier.

20. The system of claim 19, wherein said matching engine is further configured to place matching target objects and constraints within a target stack and a constraint stack in order as each is discovered during said single pass, which results in more specific targets and constraints being placed upon in an upper position of the target stack and the constraint stack compared to less specific targets and constraints.

* * * * *